(12) United States Patent
Brennan et al.

(10) Patent No.: US 10,165,007 B2
(45) Date of Patent: Dec. 25, 2018

(54) SECURING DATA USAGE IN COMPUTING DEVICES

(75) Inventors: David John Brennan, Redmond, WA (US); Aditi Desai, Redmond, WA (US); Rajesh Ramanathan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 262 days.

(21) Appl. No.: 13/233,032

(22) Filed: Sep. 15, 2011

(65) Prior Publication Data

US 2013/0074142 A1 Mar. 21, 2013

(51) Int. Cl.
*H04L 29/06* (2006.01)
*G06F 21/31* (2013.01)
*G06F 21/62* (2013.01)

(52) U.S. Cl.
CPC ............. *H04L 63/20* (2013.01); *G06F 21/31* (2013.01); *G06F 21/6218* (2013.01); *G06F 21/6245* (2013.01); *H04L 63/105* (2013.01)

(58) Field of Classification Search
CPC ......... G06F 17/30082; G06F 17/30085; G06F 21/6245; G06F 21/31; G06F 21/6218; H04L 29/06986; H04L 29/08819; H04L 63/105; H04L 63/107; H04L 63/108; H04L 67/2852; H04L 63/20
See application file for complete search history.

(56) References Cited

U.S. PATENT DOCUMENTS

| 6,192,408 | B1 * | 2/2001 | Vahalia ............. G06F 17/30171 707/E17.007 |
| 7,627,753 | B2 * | 12/2009 | Whitten .................. A63F 13/12 713/161 |
| 7,797,973 | B2 * | 9/2010 | Field .................... E05B 27/0032 70/337 |
| 2002/0083078 | A1 * | 6/2002 | Pardon .................... G06F 9/466 |
| 2002/0112038 | A1 * | 8/2002 | Hessmer et al. .............. 709/220 |
| 2002/0133579 | A1 * | 9/2002 | Bernhardt .............. G06Q 10/06 709/223 |

(Continued)

FOREIGN PATENT DOCUMENTS

| CN | 101120355 A | 2/2008 |
| CN | 101292246 A | 10/2008 |

(Continued)

OTHER PUBLICATIONS

"International Search Report", dated Oct. 12, 2012, Application No. PCT/US2012/051491, Filed Date: Aug. 17, 2012, pp. 9.

(Continued)

*Primary Examiner* — Chau Le
(74) *Attorney, Agent, or Firm* — Michael Best & Friedrich LLP

(57) ABSTRACT

Policies are applied to specific data rather than to an entire computing device that contains the specific data. Access to the specific data is controlled by the policies utilizing various password or other authentication credential requirements, selective data caching, data transmission, temporary data storage, and/or pre-defined conditions under which the specific data is to be erased or rendered inaccessible. Policies may be defined by an administrator and pushed to a mobile computing device, whereat the policies are enforced.

20 Claims, 8 Drawing Sheets

(56) References Cited

U.S. PATENT DOCUMENTS

| | | |
|---|---|---|
| 2003/0018798 A1 | 1/2003 | Lee et al. |
| 2005/0097166 A1* | 5/2005 | Patrick .................. H04L 63/20 709/203 |
| 2005/0154751 A1* | 7/2005 | Levi ..................... G06Q 10/06 |
| 2006/0095953 A1* | 5/2006 | Frank ................. H04L 9/3231 726/1 |
| 2006/0112427 A1 | 5/2006 | Shahbazi |
| 2006/0120526 A1* | 6/2006 | Boucher ............. G06F 21/6218 380/247 |
| 2006/0147043 A1* | 7/2006 | Mann .................. H04L 41/0893 380/270 |
| 2006/0224742 A1 | 10/2006 | Shahbazi |
| 2007/0006289 A1* | 1/2007 | Limont et al. ................... 726/6 |
| 2007/0233687 A1* | 10/2007 | Iwase .................... G06F 21/608 |
| 2008/0178300 A1* | 7/2008 | Brown ................ G06F 21/6218 726/29 |
| 2008/0194296 A1 | 8/2008 | Roundtree |
| 2008/0198863 A1 | 8/2008 | Volpano et al. |
| 2009/0025057 A1 | 1/2009 | Mattsson |
| 2009/0198697 A1 | 8/2009 | Bilger et al. |
| 2009/0247125 A1* | 10/2009 | Grant ................... H04M 1/7253 455/411 |
| 2009/0271844 A1 | 10/2009 | Zhang et al. |
| 2010/0037323 A1 | 2/2010 | Lemieux et al. |
| 2010/0081417 A1 | 4/2010 | Hickie |
| 2010/0115581 A1 | 5/2010 | Goldschlag et al. |
| 2010/0299152 A1 | 11/2010 | Batchu et al. |
| 2011/0137823 A1* | 6/2011 | Robb ....................... G06F 9/54 705/36 R |
| 2011/0145574 A1* | 6/2011 | Ju .......................... H04N 7/181 713/166 |
| 2011/0231900 A1* | 9/2011 | Shimoe ................. G06F 21/604 726/1 |
| 2012/0030187 A1* | 2/2012 | Marano .............. G06F 21/6218 707/709 |
| 2012/0078994 A1* | 3/2012 | Jackowski .............. H04L 47/19 709/202 |
| 2012/0144464 A1* | 6/2012 | Fakhrai ................... G06F 21/41 726/6 |
| 2012/0317239 A1* | 12/2012 | Mulder ................ G06Q 10/101 709/219 |
| 2013/0042295 A1* | 2/2013 | Kelly ..................... G06F 21/53 726/1 |
| 2013/0055347 A1* | 2/2013 | Chawla ................. H04W 12/08 726/3 |
| 2016/0092462 A1* | 3/2016 | Raj ..................... G06Q 10/101 707/704 |

FOREIGN PATENT DOCUMENTS

| | | |
|---|---|---|
| CN | 101819612 A | 9/2010 |
| EP | 2096829 B1 * | 12/2010 |

OTHER PUBLICATIONS

Casole, et al., "Secure access to corporate resources in a multi-access perspective", Retrieved at <<http://ieeexplore.ieee.org/stamp/stamp.jsp?tp=&arnumber=1350240>>, 5th European (Conf. Publ. No. 492) Personal Mobile Communications Conference, Apr. 22-25, 2003, pp. 482-489.

Abbadi, et al., "Preventing Insider Information Leakage for Enterprises", Retrieved at <<http://ieeexplore.ieee.org/stamp/stamp.jsp?tp=&arnumber=4622568>>, Second International Conference on Emerging Security Information, Systems and Technologies, Aug. 25-31, 2008, pp. 99-106.

"Windows Mobile-Based Devices and Security: Protecting Sensitive Business", Retrieved at <<http://download.microsoft.com/download/4/7/c/47c9d8ec-94d4-472b-887d-4a9ccf194160/6.%20WM_Security_Final_print.pdf>>, Feb. 2004, pp. 36.

Ricci, et al., "Embedded System Security", Retrieved at <<http://citeseerx.ist.psu.edu/viewdoc/download?oi=10.1.1.98.9446&rep=rep1&type=pdf>>, Retrieved Date: Mar. 21, 2011, pp. 33.

"The Fundamentals of Mobile Access to Exchange 2007", Retrieved at <<http://technet.microsoft.com/en-us/library/bb266973(EXCHG.80).aspx>>, Retrieved Date: Mar. 21, 2011, pp. 9.

"Extended European Search Report Received for European Patent Application No. 12832406.8", dated Apr. 10, 2015, 7 Pages.

Chinese Office Action dated Dec. 1, 2014 for Chinese patent application No. 201210342376.1, a counterpart foreign application of U.S. Appl. No. 13/233,032, 12 pages.

Translated Chinese Office Action dated Jul. 15, 2015 for Chinese patent application No. 201210342376.1, a counterpart foreign application of U.S. Appl. No. 13/233,032, 13 pages.

Translated Chinese Office Action dated Jan. 13, 2016 for Chinese patent application No. 201210342376.1, a counterpart foreign application of U.S. Appl. No. 13/233,032, 6 pages.

"Office Action Issued in European Patent Application No. 12832406.8", dated Feb. 14, 2018, 6 Pages.

* cited by examiner

SECURING DATA USAGE IN COMPUTING DEVICES

BACKGROUND

Recent computing trends have shown a movement from traditional desktop computers to mobile computing devices. Mobile computing devices, such as laptops, netbooks, tablets, and mobile phones, provide the convenience of portability and performance that is capable of executing common tasks including e-mail, Web browsing, word processing, photo editing, content consumption, and the like. The mobile nature of these devices, however, poses unique challenges as compared to desktop computers.

Mobile computing devices often store or enable access to sensitive data, such as data related to an enterprise. For example, it is increasingly common for an individual to utilize a mobile computing device for both personal and enterprise-related tasks. As the individual travels (e.g., to/from work), sensitive enterprise data may be exposed to multiple communications networks, including cellular networks and Wi-Fi networks, some of which may be unsecure. This may pose a security threat to the enterprise due to the possibility of enterprise data being inadvertently or intentionally shared by the mobile computing device when away from an enterprise network.

Data security policies and controls for mobile devices are often implemented in an effort to eliminate or at least mitigate the aforementioned and other security-related concerns. These security policies and controls are implemented utilizing an all or nothing approach. Many users opt for the nothing approach if permitted to do so because of the additional overhead imposed by sweeping policies that often adversely affect the usability of their devices for personal data. Typically, however, these security policies and controls are enforced at the expense of decreased usability with regard to access to personal data.

It is with respect to these and other considerations that the disclosure made herein is presented.

SUMMARY

Concepts and technologies are described herein for securing data usage in computing devices. In accordance with the concepts and technologies disclosed herein, security policies and controls are applied to specific data rather than to the entire device that contains the data. The specific data may be any type of data including, but not limited to, enterprise data and personal data. This approach provides a balance between the enterprise need for security and control of data and the need for ease of use and control of personal data. Moreover, this approach allows a user to selectively set his or her data access policy for accessing personal data associated with various consumer services. For example, a user may establish a password prompt for access an email service but require no password or other authentication mechanism for accessing pictures, music, or some other data. The concepts and technologies disclosed herein provide controls for sensitive data utilizing various password requirements, selective data caching, data transmission, temporary data storage, and/or pre-defined conditions under which data is to be erased or rendered inaccessible.

According to one aspect, a computer is configured to receive a definition for a policy configured to control access to data on a computing device, store the policy, and send the policy to the computing device, whereat access to the data is controlled in accordance with the policy. In some embodiments, the policy includes a lock policy including instructions specifying one or more lock levels that each permit access to the data or a portion thereof in response to receipt of a valid authentication credential. In some embodiments, the policy includes a storage control policy including instructions that dictate storage of the data on the computing device. The storage control policy may indicate whether the data can be cached on the computing device, may indicate how long the data can be cached on the computing device, may indicate how long the data can be stored on the computing device, when and how the data may be transmitted to or from the device, or may indicate one or more conditions under which the data is to be erased or rendered inaccessible.

According to another aspect, a computer, such as a mobile computing device, is configured to receive a policy, receive a request for specific data associated with the policy, and allow or deny access to the specific data in accordance with the policy. The policy may be a lock policy or a storage control policy as describe above.

According to yet another aspect, a mobile computing device is configured to store personal data associated with a user of the mobile computing device, store enterprise data associated with an enterprise, store one or more policies, that control access to the enterprise data, receive a data request for at least a portion of the enterprise data, and selectively allow access to the portion of the enterprise data in accordance with the one or more policies without inhibiting access to the personal data.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
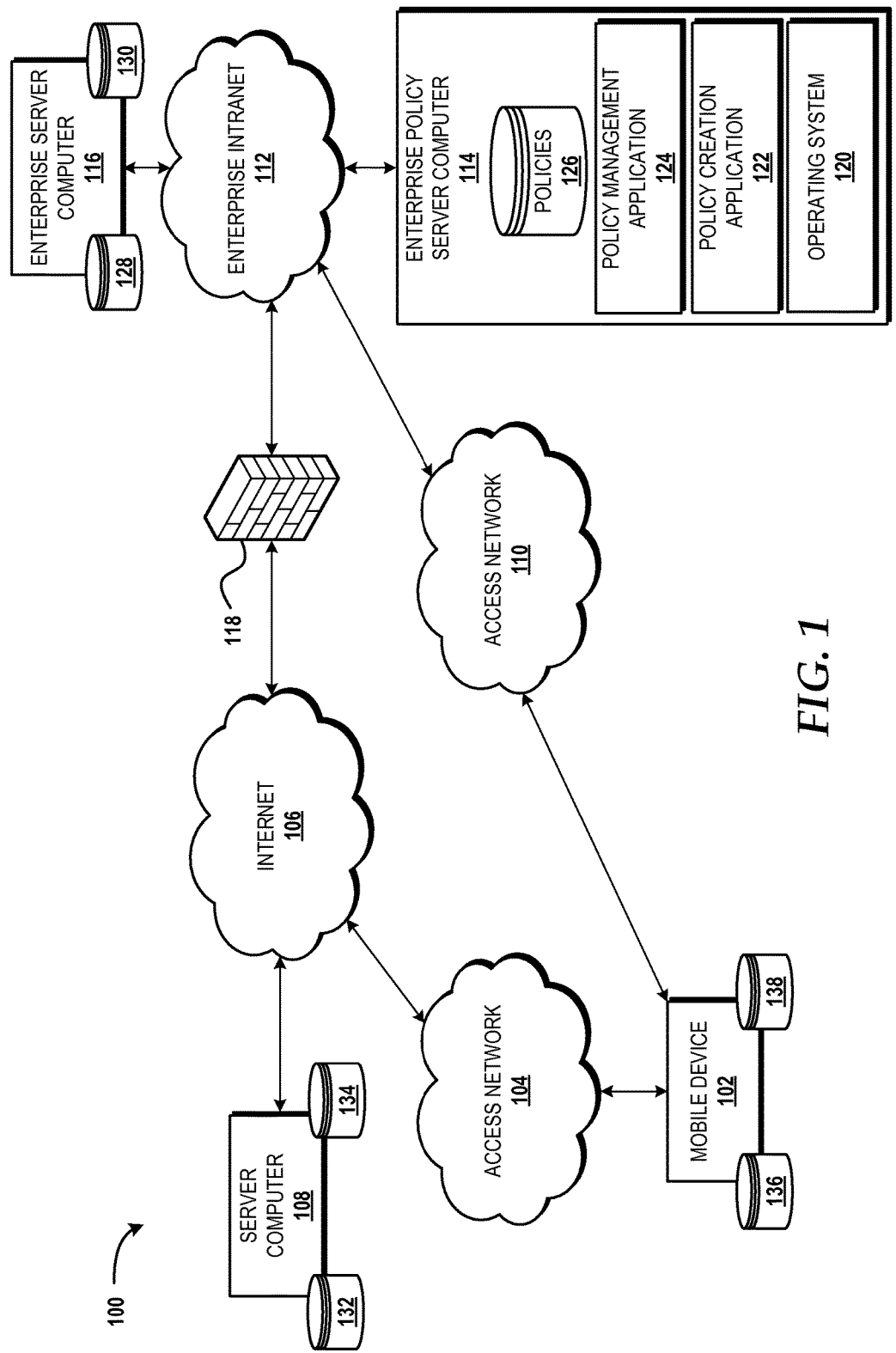
FIG. 1 is a system diagram illustrating an exemplary operating environment for the various embodiments disclosed herein.

The following detailed description is directed to concepts and technologies for securing data usage in computing devices. According to the concepts and technologies described herein, security policies and controls are applied to specific data rather than to the entire device that contains the data. More specifically, the concepts and technologies disclosed herein provide controls for sensitive data utilizing various password requirements, selective data caching, temporary data storage, and/or pre-defined conditions under which data is to be erased or rendered inaccessible. The concepts and technologies disclosed herein are, at times, described in context of access control to enterprise data. It should be understood, however, that the concepts and technologies disclosed herein may additionally or alternatively be used to control access to other types of data.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for securing data usage will be presented.

Referring now to FIG. 1, aspects of one operating environment 100 for the various embodiments presented herein will be described. The operating environment 100 shown in FIG. 1 includes a mobile computing device 102, such as, but not limited to, a laptop, netbook, tablet, personal digital assistant, mobile video game system, e-reader, or mobile phone. The mobile computing device 102 is illustrated as being in communication with a first access network 104, such as a cellular network, WIFI network, WIMAX network, or another network including other wireless networks or wireline networks. The first access network 104 facilitates access to an internet 106 through which the mobile computing device 102 may access a server computer 108. The first access network 104 may additionally provide voice access to the mobile computing device 102. For example, the first access network 104 may provide cellular voice or voice over internet protocol ("VoIP") access to the mobile computing device 102.

The mobile computing device 102 may additionally or alternatively establish communication with a second access network 110, which may also be a cellular network, WIFI network, WIMAX network, or another network including other wireless networks or wireline networks. The second access network 110 may additionally provide voice access to the mobile computing device 102.

In some embodiments, the access networks 104, 110 are simultaneously available to the mobile computing device 102, such as when one of the access networks 104, 110 is a cellular network and the other is a WIFI or WIMAX network. Alternatively, in some embodiments, the access networks 104, 110 are physically disparate such that the mobile computing device 102 is unable to simultaneously communicate with both access networks 104, 110. For example, the first access network 104 may be a WIFI network or other network at a user's home and the second access network 110 may be a WIFI network or other network at a user's work. It is contemplated that the mobile computing device 102 may be configured to simultaneously maintain a connection with both of the access networks 104, 110. Moreover, the mobile computing device 102 may prioritize data access via one of the access networks 104, 110 over the other through one or more settings made available on the mobile computing device 102.

In the illustrated embodiment, the second access network 110 facilitates access to an enterprise intranet 112, which in turn is in communication with an enterprise policy server computer 114, an enterprise server computer 116, and the internet 106 via a firewall 118. The enterprise policy server computer 114 includes an operating system 120, a policy creation application 122, a policy management application 124, and policies 126. The operating system 120 is a computer program for controlling the operation of the enterprise policy server computer 114. The policy creation application 122 and the policy management application 124 execute on top of the operating system 120 to provide various functionality described herein. The policy creation application 122 is an application program through which a user (e.g., an administrator) can create and configure the policies 126. The policy management application 124 is an application program through which a user can manage the policies 126. The policy creation application 122 and the policy management application 124 are illustrated as distinct application programs, however it should be understood that, in some embodiments, the functionality of these applications is combined.

In some embodiments, the policies 126 are created by an administrator of an enterprise associated with the enterprise intranet 112 via the policy creation application 122 of the enterprise policy server computer 114. In other embodiments, the policies 126 are created remotely and sent to or imported by the enterprise policy server computer 114 for storage. In any case, the enterprise policy server computer 114 is configured to distribute one or more of the policies 126 to the enterprise server computer 116, the server computer 108, or another data source, such as a document repository, a file share, a Website server, an e-mail server, or some other data source, so that the data source can control access to data stored therein by the mobile computing device 102. The enterprise policy server computer is also configured to distribute one or more of the policies 126 to the mobile computing device 102, so that access to data stored at least temporarily on the mobile computing device 102 can be controlled.

The policies 126 generally include instructions that define access locks and/or storage controls for data that is associated with the enterprise and is accessible by and/or stored within the mobile computing device 102. The data may include, but is not limited to, contacts, e-mail, documents, pictures, videos, applications, and/or Web content. Policies including instructions that define access locks are referred to herein as "lock policies." Policies including instructions that define storage controls are referred to herein as "storage control policies." it should be understood that any given piece of data may be associated with and thus controlled by one or more lock policies and/or one or more storage control policies.

Lock policies include instructions specifying one or more lock levels that each permit access to data or a portion thereof that has been defined as accessible at that particular lock level. A user may be required to provide an authentication mechanism, such as a password, personal identification number ("PIN"), biometric data, radio frequency identification ("RFID"), location (e.g., GPS, triangulation, or assisted-OPS), attached network, or other form of authentication, in any combination, to access a particular lock level. In some embodiments, a lock policy could specifies that a user needs to be in a certain location (e.g., as determined through GPS or other location determining technique) in order to access certain data. In some embodiments, a lock policy specifies that a user's device needs to be connected to a certain network in order to access certain data. In some embodiments, a lock policy specifies that a user needs to authorize access utilizing a certain authentication mechanism to access specific data. In some embodiments, locks at a higher level are sufficient to lock documents at a lower level without requiring further authentication via the same or a different authentication mechanism. Alternatively, authentication may be required at each lock level or a certain number of lock levels prior to unlocking all lock levels.

Storage control policies include instructions that dictate the storage of data on the mobile computing device 102. In some embodiments, a storage control policy includes instructions indicating whether certain data can be cached on the mobile computing device 102 and may further include instructions indicating how long the data can be cached on the mobile computing device 102. In some embodiments, a storage control policy includes instructions indicating how long certain data can be stored on the mobile computing device 102. In some embodiments, a storage control policy includes instructions indicating one or more conditions under which certain data is to be erased or rendered inaccessible.

In some embodiments, one or more of the policies 126 are defined in a mobile digital certificate. For example, when a device, such as the mobile computing device 102, is enrolled with the enterprise, the device can be assigned a mobile digital certificate, which is then used by the device to access data provided via the enterprise intranet 112. An enrollment process for enrolling the mobile computing device 102 with the enterprise may be facilitated via the policy management application 124.

In some embodiments, one or more of the policies 126 are created as part of an information rights management ("IRM") or digital rights management ("DRM") mechanism that is applied by a server (e.g., the enterprise server computer 116) to a document reader, such as an application resident on the mobile computing device 102 that is configured to read and, in some instances, modify certain data types.

In some embodiments, one or more of the policies 126 are created to enable remote wipe of specific data from the mobile computing device 102. It should be understood that this remote wipe enables personal data and other enterprise data to be maintained on the mobile computing device 102.

In some embodiments, one or more policies 126 are created to control when certain data can be transmitted and/or received. For example, a policy may specify that sensitive enterprise data can be sent and/or received only from one or more specified networks such as only the enterprise intranet 112 and not on any other network such as a cellular network or a home WIFI access network.

In some embodiments, one or more policies 126 are created to specify that certain data is not to be accessed on the mobile computing device 126 or, more generally, any device that can change its location.

In some embodiments, one or more policies 126 are created to specify that certain data is valid only in geographical location X during time Y, after which the certain data is no longer valid.

It is contemplated that the lock policies and/or the storage control policies may rely at least partially upon one or more features or components of the mobile computing device 102 for enforcement. For example, policies may be selectively enforced based upon location (e.g., as determined via a global positioning system and/or triangulation), time, and/or based upon a usage of a particular function or application on the mobile computing device 102.

Any of the aforementioned embodiments of various policies may be combined in various configurations such that different protection levels are in place for certain data. For example, a first policy may specify one or more locations in which access to the data is granted only when the user is able to successfully provide authentication credentials such as a passcode or PIN to access the data in accordance with a second policy.

In some embodiments, one or more of the policies 126 are sent to the enterprise server computer 116, the server computer 108, and/or the mobile computing device 102. The enterprise server computer 116 is configured to store an instance of the received policies as enterprise server policies 128 for application to enterprise server data 130. The enterprise server data 130 is data stored and served by the enterprise server computer 116 to the mobile computing device 102 via the enterprise intranet 112 and the access network 110. The server computer 108 is configured to store an instance of the received policies as server policies 132 for application to server data 134. The server data 134 is data stored and served by the server computer 108 to the mobile computing device 102 via the internet 106 and the access network 104. The mobile computing device 102 is configured to store an instance of the received policies as mobile device policies 136 for application to mobile device data 138. The mobile device data 138 may include an instance of the enterprise server data 130 or a portion thereof, an instance of the server data 134 or a portion thereof and/or data created locally on the mobile computing device 102 for which one or more of the policies 126 are applicable.

According to various embodiments, the enterprise policy server computer 114, the enterprise server computer 116, and/or the server computer 108 are personal computers ("PC") such as desktop, tablet, or laptop computer systems. The enterprise policy server computer 114, the enterprise server computer 116, and/or the server computer 108 may include other types of computing systems including, but not limited to, server computers, handheld computers, netbook computers, tablet computers, embedded computer systems, personal digital assistants, mobile telephones, smart phones, or other computing devices.

It should be understood that some implementations of the operating environment 100 include multiple enterprise policy server computers 114, multiple enterprise server computers 116, multiple server computers 108, multiple mobile computing devices 102, more than two access networks 104, 110, multiple internets 106, multiple enterprise intranets 112, and/or multiple firewalls 118. It should also be understood that multiple operating systems 120, multiple policy creation applications 122, multiple policy management applications 124, and/or multiple repositories for storing the policies 126 may be used by the enterprise policy server computer 114; and/or one or more of these components may be provided by another enterprise server computer (not shown). Moreover, although not shown in FIG. 1, the enterprise server computer 116, the server computer 108, and the mobile device 102 may each be configured with an operating system and one or more application programs that are configured to execute on top of the operating system to provide various functionality described herein. Thus, the illustrated embodiments should be understood as being exemplary, and should not be construed as being limiting in any way.

Figure 2:
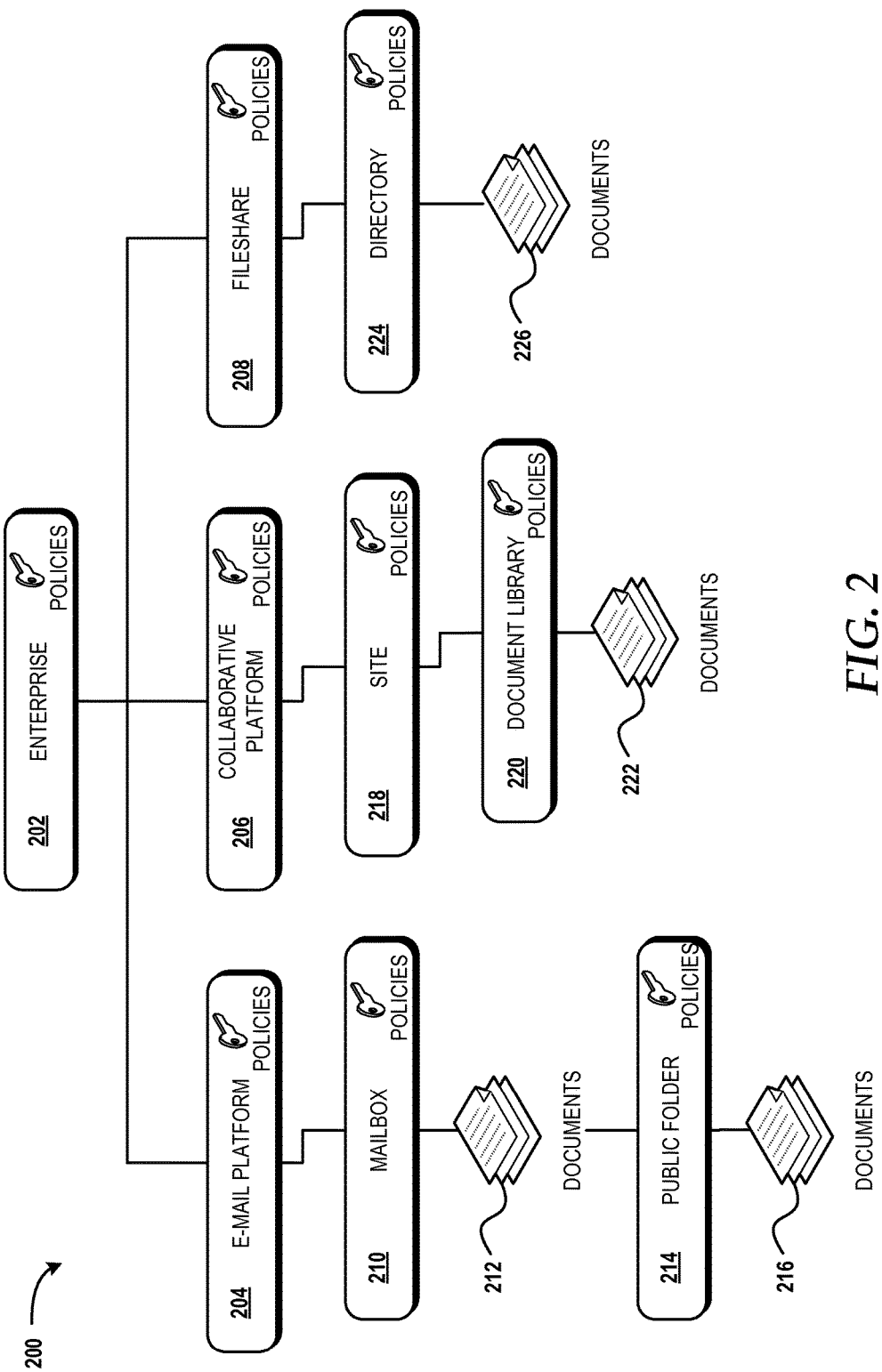
FIG. 2 is a diagram illustrating an enterprise document storage hierarchy, according to an exemplary embodiment.

Turning now to FIG. 2, a diagram illustrating an exemplary enterprise document storage hierarchy 200 will be described. The enterprise document storage hierarchy 200 includes a root level 202. In some embodiments, the root level 202 is a lock level for controlling access to the enterprise intranet 112. Users that are authenticated to the root level 202 have access to the enterprise intranet 112, but may or may not have access to additional resources within the enterprise intranet 112 depending upon the definition of the policy or policies dictating access at the root level 202. In the illustrated embodiment, these resources include an e-mail platform 204, a collaborative platform level 206, and a file share level 208, each of which is a lock level for controlling access to specific resources of the enterprise intranet 112. It should be understood that any platform, computer system, or mobile computing device associated with an enterprise may be given a lock level and may or may not be hierarchically organized with one or more other platforms, computer systems, and/or computing devices based upon varying lock levels dictating access thereto.

The e-mail platform level 204 is a lock level for controlling access to resources related to an e-mail platform of the enterprise. The e-mail platform, in some embodiments, is a server-side collaborative e-mail application program, such as MICROSOFT EXCHANGE, available from Microsoft Corporation of Redmond, Wash., although other e-mail platforms are contemplated. The e-mail platform level 204 includes a mailbox level 210, one or more mailbox documents 212, a public folder level 214, and one or more public documents 216.

The mailbox level 210 is a lock level for controlling access to mailboxes available on the e-mail platform. The mailboxes may be particular to a user or a workgroup within the enterprise. The mailbox documents 212 include e-mail documents or other documents associated with a particular mailbox. The mailbox documents 112 under the mailbox level 210 may be, individually or together, access-limited via one or more policy. The public folder level 214 is a lock level for controlling access to the one or more public documents 216. The public documents 216 documents associated with the public folder level 214.

Turning back to the collaborative platform level 206, this level is a lock level for controlling access to resources related to a collaborative platform of the enterprise. The collaborative platform, in some embodiments, is a collaborative Web application program, such as MICROSOFT SHAREPOINT, available from Microsoft Corporation of Redmond, Wash., although other collaborative Web application programs are contemplated. The collaborative platform level 206 includes a site level 218, a document library level 220, and one or more documents 222. The site level 218 is a lock level controlling access to one or more sites available on the collaborative platform. The sites may be configured, for example, as SHAREPOINT sites. The sites available at the site level 218 may, in turn, include one or more document libraries at the document library level 220. The document library level 220 is a lock level controlling access to the one or more documents 222.

Turning back to the file share level 208, this level is a lock level for controlling access to resources related to a file share platform of the enterprise. The file share level 208 is a lock level including one or more directories at a directory level 224. The directory level 224 is a lock level controlling access to one or more documents 226.

It should be understood that the enterprise document storage hierarchy 200 described above illustrates where policies may be applied. Policies for mobile data lock, caching, data transmission, and data retention may be specified at each level, at the document level, and may be inherited or not inherited from another level (e.g., a parent level), in general, however, for a given document the strictest policy may be applied by combining policies from any of the documents 216, 222, 226 upwards toward the root level 202 on their respective paths. For locking policies, a higher lock level may be sufficient to lock documents at a lower level without requiring authentication at each level.

Figure 3:
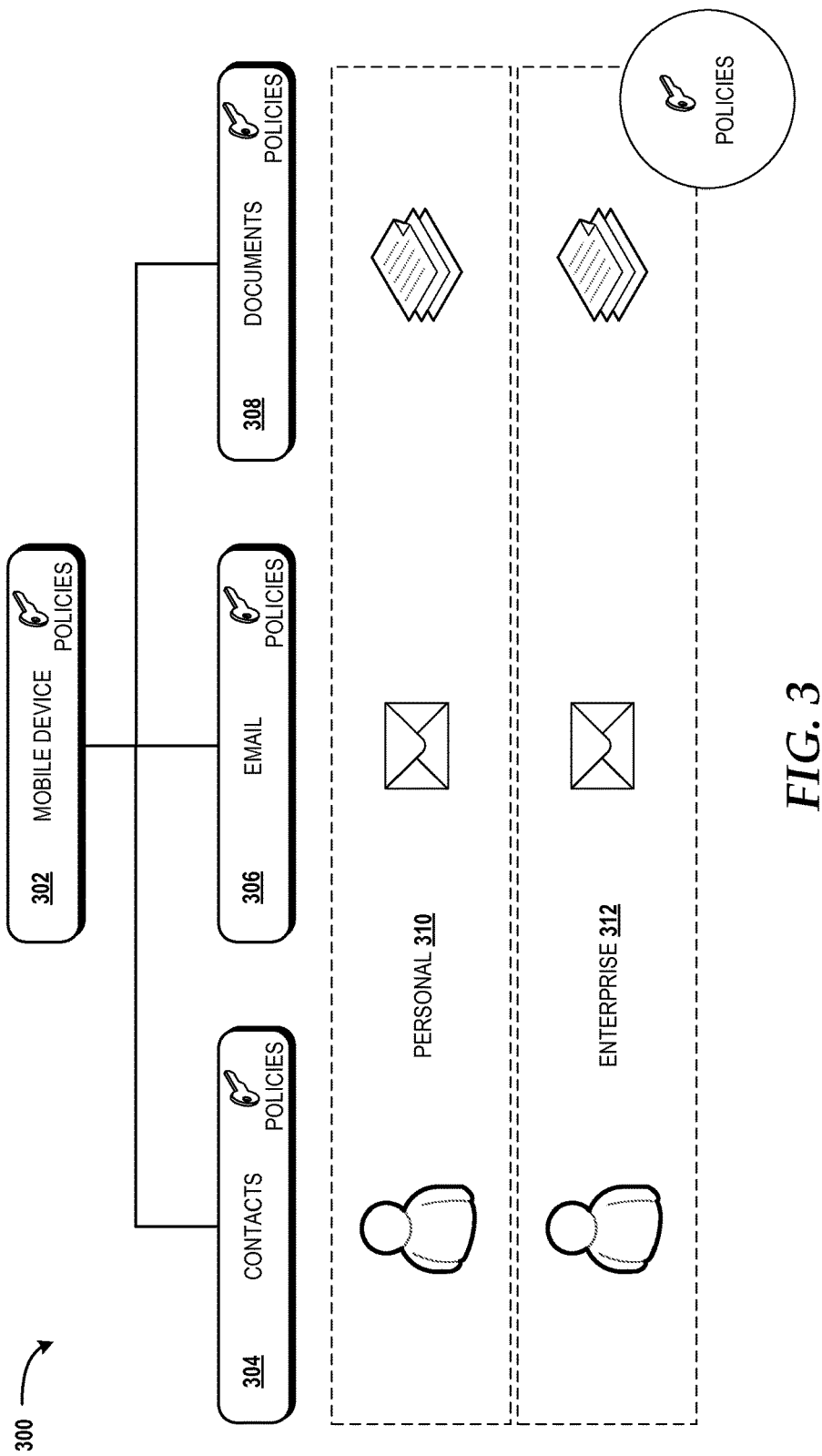
FIG. 3 is a diagram illustrating a mobile computing device storage hierarchy, according to exemplary embodiments.

Turning now to FIG. 3, a diagram illustrating an exemplary mobile computing device storage hierarchy 300 will be described. The mobile computing device storage hierarchy 300 includes a mobile device level 302, which in turn includes a contacts level 304, an e-mail level 306, and a documents level 308. The contacts level 304, the e-mail level 306, and the documents level 308 are associated with personal data 310 and enterprise data 312. Policies may be applied at the contacts level 304, the e-mail level 306, the documents level 308, and/or for the enterprise data 312.

Although data types (e.g., contacts, e-mail, and documents) of the personal data 310 and the enterprise data 312 may be merged in applications and user interfaces that are configured to utilize the various data types, policies are applied to the enterprise data 312. The personal data 310 may remain under control of the owner and/or user of the mobile computing device 102 without being inhibited by enforcement of the policies.

Figure 4:
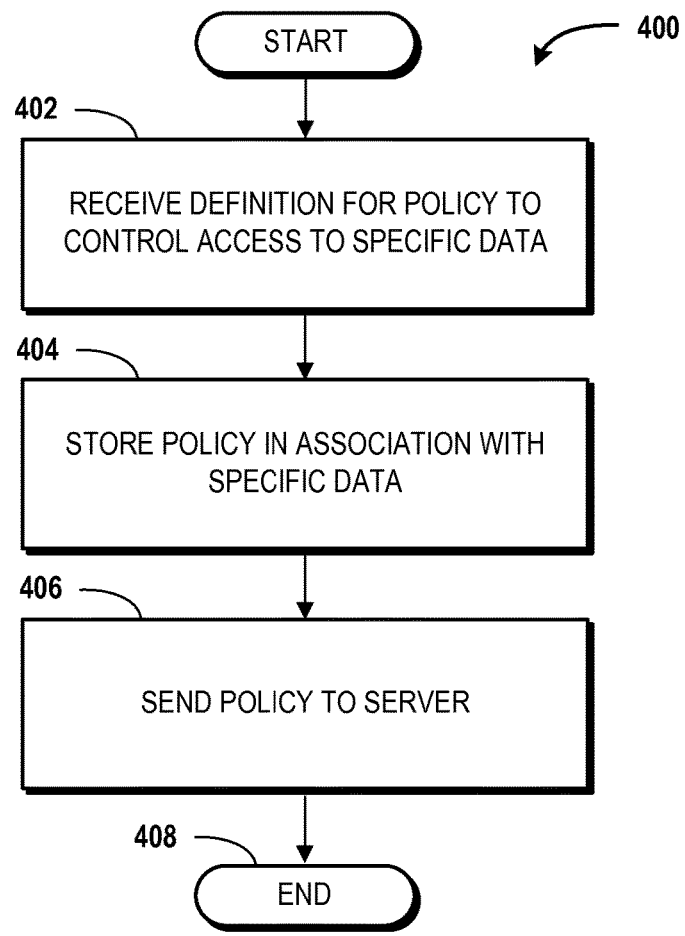
FIG. 4 is a flow diagram showing aspects of a method for creating and managing policies, according to an exemplary embodiment.

Turning now to FIG. 4, aspects of a method 400 for creating and managing policies will be described. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 400 begins at operation 402, wherein the enterprise policy server computer 114 receives a definition for a policy to control access to specific data. The definition for the policy may be provided by an administrator via the policy creation application 122. From operation 402, the method 400 proceeds to operation 404, wherein the enterprise policy server computer 114 stores the policy in association with the specific data as one of the policies 126. The administrator may desire to provide the policy to one or more servers and may designate to which servers the policy is to be sent utilizing the policy management application 124. For example, the administrator may direct the enterprise policy server computer 114 to send the policy to the enterprise server computer 116 and/or the server computer 108, at operation 406. The method 400 ends at operation 408.

Figure 5:
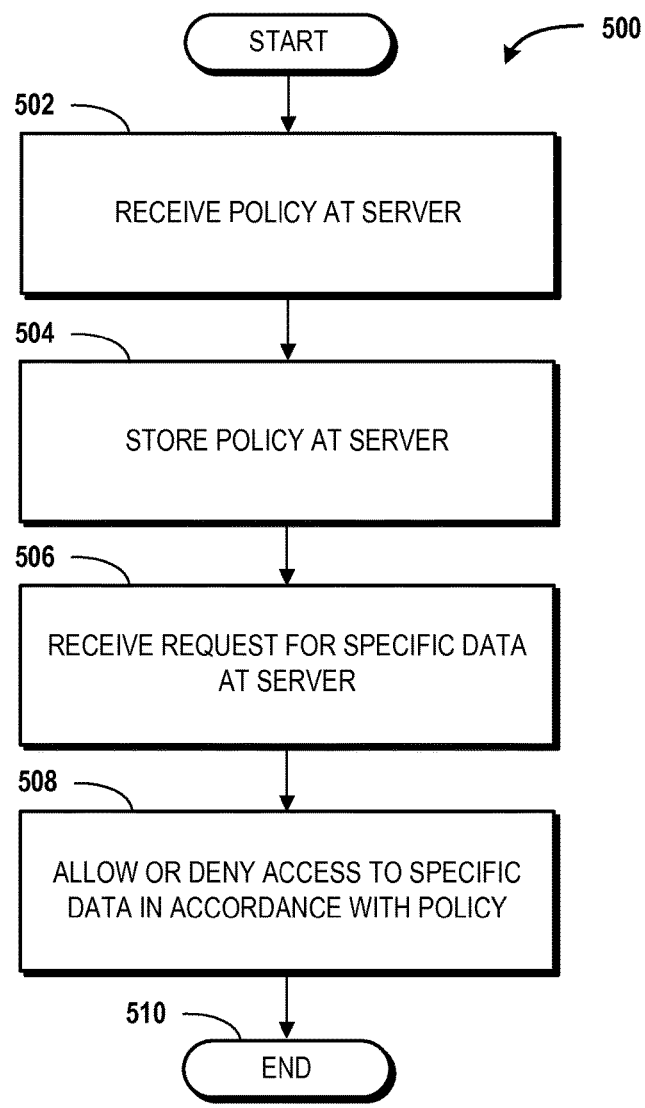
FIG. 5 is a flow diagram showing aspects of a method for enforcing a policy at a data server, according to an exemplary embodiment.

Turning now to FIG. 5, a method 500 for enforcing a policy at a data server, such as the enterprise server computer 116 or the server computer 108, will be described. For ease of description and not limitation, the enterprise server computer 116 will be described as performing the operations of the method 500.

The method 500 begins at operation 502, wherein the enterprise server computer 116 receives the policy from the enterprise policy server computer 114. From operation 502, the method 500 proceeds to operation 504, wherein the enterprise server computer 116 stores the policy in association with the specific data as one the enterprise server policies 130. The method 500 then proceeds to operation 506, wherein the enterprise server computer 116 receives a request for specific data associated with the stored policy from the mobile computing device 102. In response to receiving the request, at operation 508, the enterprise server computer 116 allows or denies the mobile computing device 102 access to the specific data in accordance with the policy. The method 500 ends at operation 510.

Figure 6:
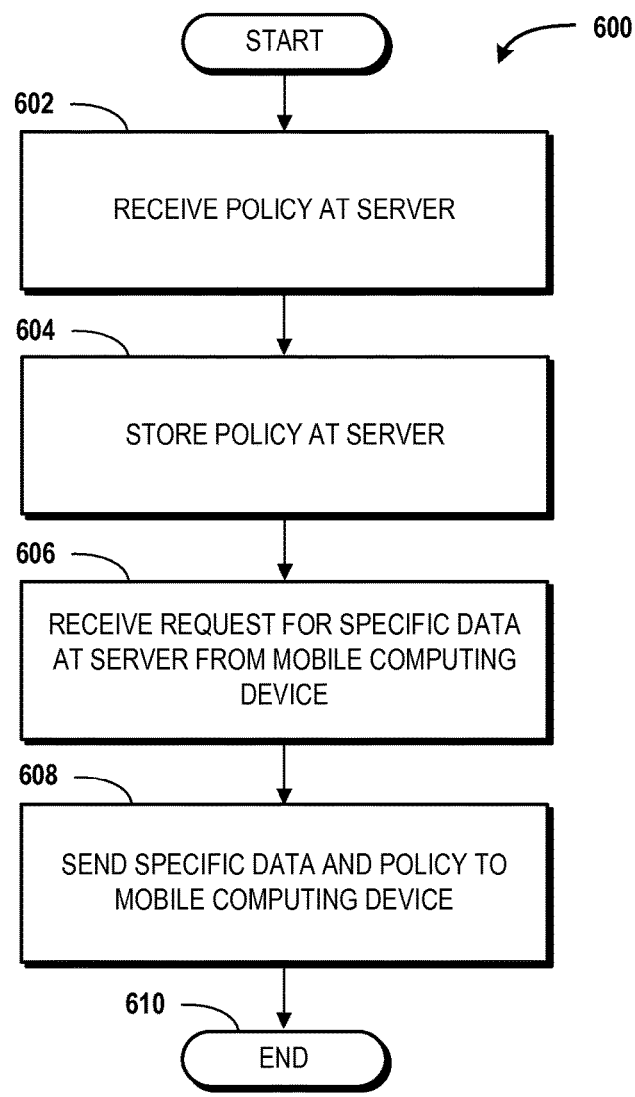
FIG. 6 is a flow diagram showing aspects of a method for providing data and associated policy to a mobile computing device, according to an exemplary embodiment.

Turning now to FIG. 6, a method 600 for providing data and associated policy to the mobile computing device 102 will be described. For ease of description and not limitation, the enterprise server computer 116 will be described as performing the operations of the method 600.

The method 600 begins at operation 602, wherein the enterprise server computer 116 receives the policy from the enterprise policy server computer 114. From operation 602, the method 600 proceeds to operation 604, wherein the enterprise policy server computer 114 stores the policy in association with specific data as one of the enterprise server policies 130. The method 600 then proceeds to operation 606, wherein the enterprise server computer 116 receives a request for specific data associated with the stored policy from the mobile computing device 102. In response to receiving the request, at operation 608, the enterprise server computer 116 sends the specific data and the associated policy to the mobile computing device 102, whereat access to the specific data is enforced in accordance with the policy. The method 600 ends at operation 610.

Figure 7:
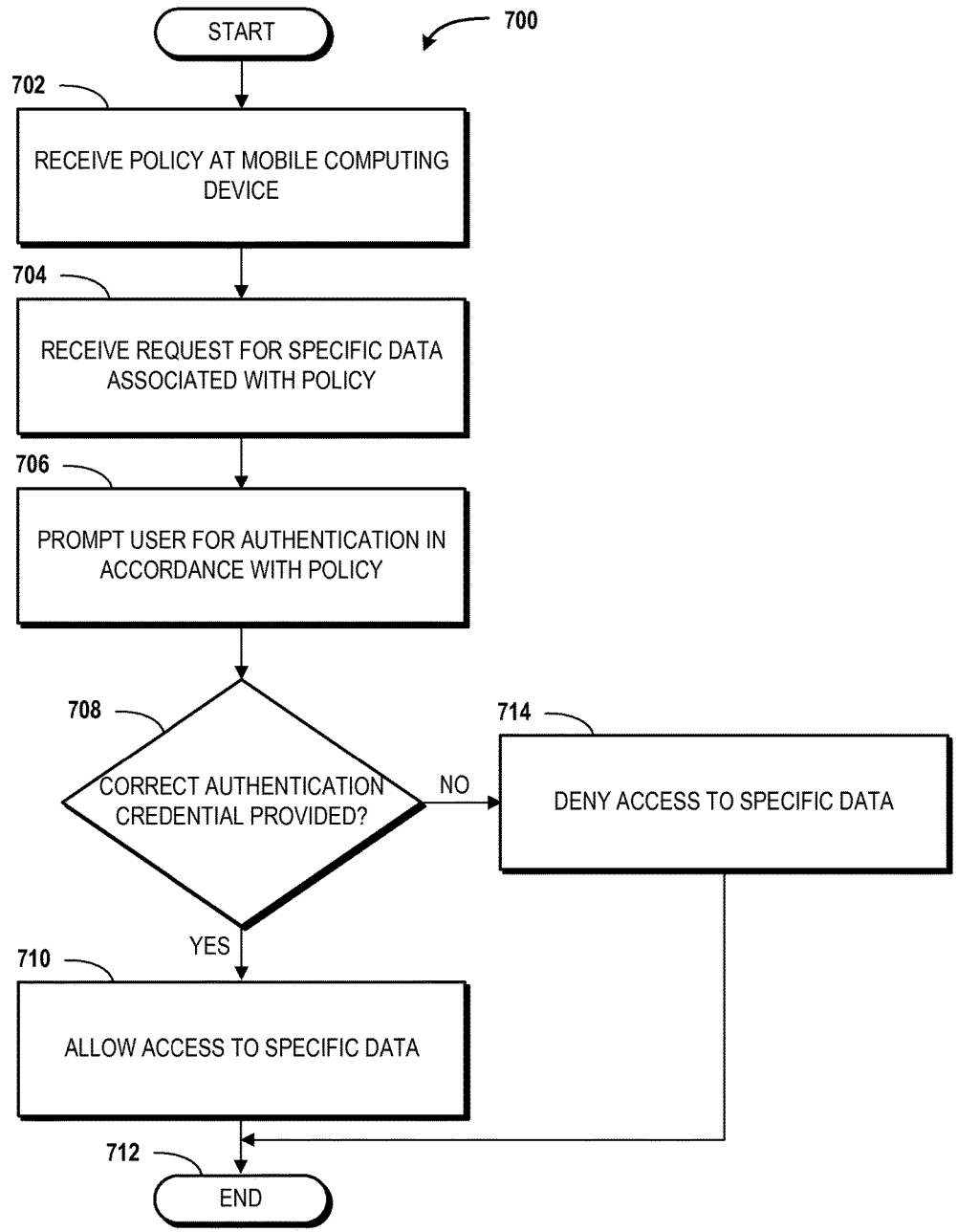
FIG. 7 is a flow diagram showing aspects of a method for enforcing a policy at a mobile computing device, according to an exemplary embodiment.

Turning now to FIG. 7, a method 700 for enforcing a policy at a mobile computing device 102 will be described. The method 700 begins at operation 702, wherein the mobile computing device 102 receives a policy. In some embodiments, the mobile computing device 102 receives the policy from a server, such as the server computer 108, the enterprise policy server computer 114, or the enterprise server computer 116, in response to a data request or a policy request generated by the mobile computer device 102 and sent to the server. In some embodiments, the mobile computing device 102 receives the policy from a server in response to an administrator instructing, via the policy management application 124, the enterprise policy server computer 114 to push the policy to the mobile computing device 102.

From operation 702, the method 700 proceeds to operation 704, wherein the mobile computing device 102 receives a request for specific data associated with the received policy. In response to receiving the data request, at operation 706, the mobile computing device 102 prompts a user for authentication in accordance with the policy. If the authentication credentials provided by the user in response to the authentication prompt are valid, the method 700 proceeds to operation 710, wherein the mobile computing device 102 allows the user to access the specific data. The method 700 then proceeds to operation 712, wherein the method 700 ends. If, however, the authentication credentials provided by the user in response to the authentication prompt are not valid, the method 700 proceeds to operation 714, wherein the mobile computing device 102 denies access to the specific data. The method 700 then proceeds to operation 712, wherein the method 700 ends.

Figure 8:
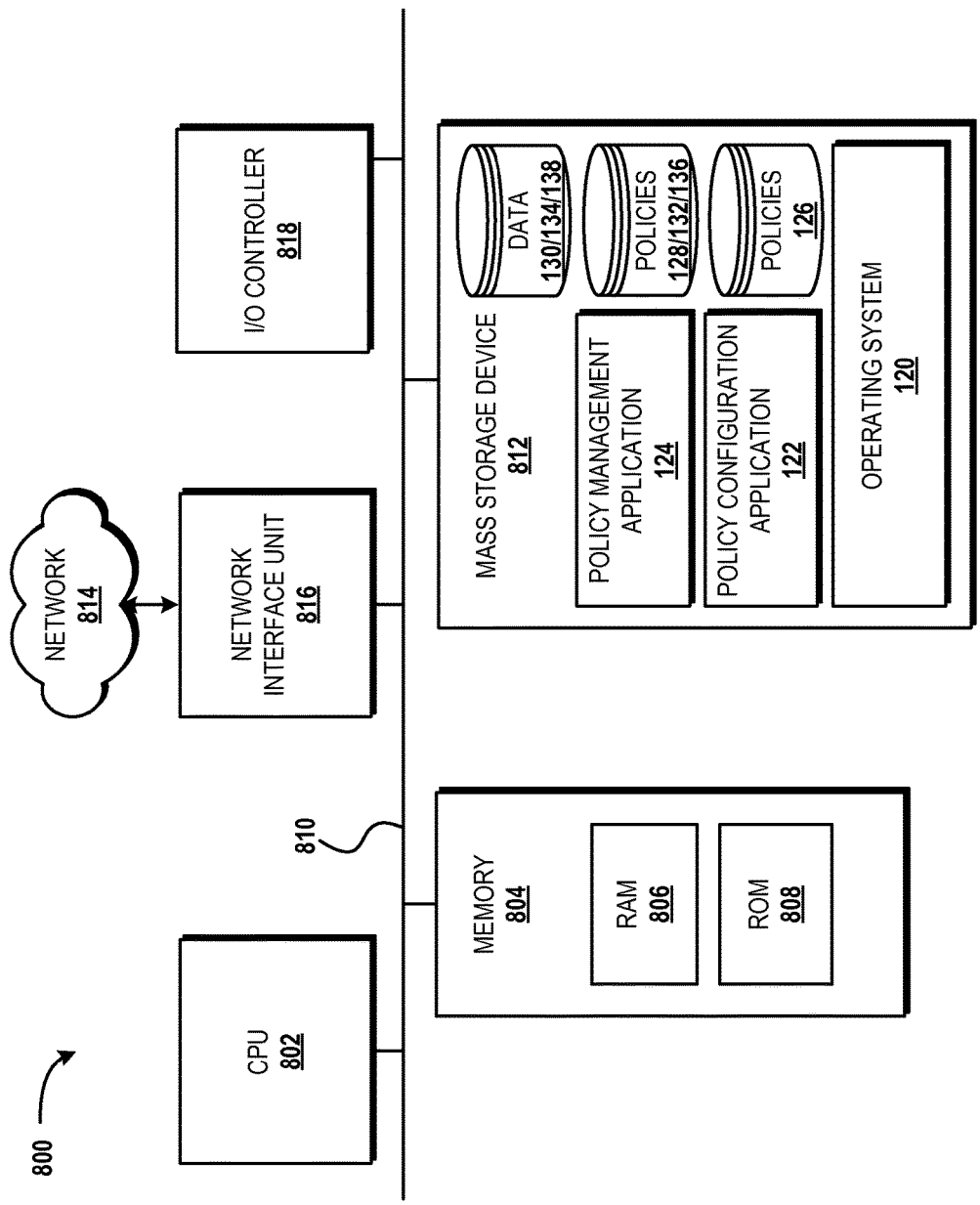
FIG. 8 is a computer architecture diagram illustrating an exemplary computer hardware and software architecture for a computing system capable of implementing aspects of the embodiments presented herein.

FIG. 8 illustrates an exemplary computer architecture 800 for a device capable of executing the software components described herein for securing data usage in mobile computing devices. Thus, the computer architecture 800 illustrated in FIG. 8 illustrates an architecture for a server computer, mobile phone, a PDA, a smart phone, a desktop computer, a netbook computer, a tablet computer, and/or a laptop computer. The computer architecture 800 may be utilized to execute any aspects of the software components presented herein with respect to any of the computer systems described herein, such as the mobile computing device 102, the enterprise policy server computer 114, the enterprise server computer 116, and the server computer 108.

The computer architecture 800 illustrated in FIG. 8 includes a central processing unit 802 ("CPU"), a system memory 804, including a random access memory 806 ("RAM") and a read-only memory ("ROM") 808, and a system bus 810 that couples the memory 804 to the CPU 802. A basic input/output system containing the basic routines that help to transfer information between elements within the computer architecture 800, such as during startup, is stored in the ROM 808. The computer architecture 800 further includes a mass storage device 812 for storing, where appropriate, the operating system 120 (or other operating system(s)), the policy configuration application 122, the policy management application 124, the policies 126, the enterprise server policies 128, the server policies 132, the mobile computing device policies 136, the enterprise server data 130, the server data 134, and the mobile computing device data 138.

The mass storage device 812 is connected to the CPU 802 through a mass storage controller (not shown) connected to the system bus 810. The mass storage device 812 and its associated computer-readable media provide non-volatile storage for the computer architecture 800. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 800. For purposes the claims, the phrase "computer storage medium" and variations thereof, does not include waves, signals, and/or other transitory and/or intangible communication media, per se.

According to various embodiments, the computer architecture 800 may operate in a networked environment using logical connections to remote computers through a network 814, such as the first access network 104, the second access network 110, the enterprise intranet 112, and/or the internet 106. The computer architecture 800 may connect to the network 814 through a network interface unit 816 connected to the bus 810. It should be appreciated that the network interface unit 816 also may be utilized to connect to other types of networks and remote computer systems. The computer architecture 800 also may include an input/output controller 818 for receiving and processing input from a number of other devices, including a keyboard, mouse, or electronic stylus (not shown in FIG. 8). Similarly, the input/output controller 818 may provide output to a display screen, a printer, or other type of output device (also not shown in FIG. 8).

It should be appreciated that the software components described herein may, when loaded into the CPU 802 and executed, transform the CPU 802 and the overall computer architecture 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 800 in order to store and execute the software components presented herein. It also should be appreciated that the computer architecture 800 may include other types of computing devices, including hand-held computers, embedded computer systems, personal digital assistants, and other types of computing devices known to those skilled in the art. It is also contemplated that the computer architecture 800 may not include all of the components shown in FIG. 8, may include other components that are not explicitly shown in FIG. 8, or may utilize an architecture completely different than that shown in FIG. 8.

Based on the foregoing, it should be appreciated that concepts and technologies for securing data usage have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. An apparatus comprising:
   a memory to store computer readable instructions; and
   one or more processors to execute the computer readable instructions to:
      receive a policy comprising a lock policy specifying a plurality of hierarchical lock levels that each permit access to a document that has been defined as accessible at that lock level, the plurality of lock levels including a first lock level assigned to a first document and a second lock level lower than the first lock level that is assigned to a second document, wherein the policy further specifying that users are required to provide a first authentication at the first lock level assigned to the first document to access the first document and are required to provide a second authentication at the second lock level assigned to the second document to access the second document;
      receive a request to lock the first document from a user;
      in response to receiving the request to lock the first document, prompt the user for the first authentication at the first lock level assigned to the first document specified in the request and receive the first authentication at the first lock level from the user;
      in response to receiving the request to lock the first document and receiving the first authentication at the first lock level assigned to the first document specified in the request, automatically lock the first document and the second document without requiring the second authentication at the second lock level for the second document;
      receive a request to access the second document; and
      allow or deny access to the second document in accordance with the policy.

2. The apparatus of claim 1, wherein the lock policy further comprises instructions specifying one or more lock levels that each permit access to the document based on a location of a computing device that sends a request to access the document.

3. The apparatus of claim 1, wherein the policy further comprises a storage control policy comprising instructions that dictate storage of the document on a computing device that sends the request.

4. The apparatus of claim 3, wherein the storage control policy comprises instructions indicating whether the document can be cached on the computing device and, if the document can be cached, for how long the document can be cached.

5. The apparatus of claim 3, wherein the storage control policy further comprises instructions indicating how long the document can be stored on the computing device.

6. The apparatus of claim 3, wherein the storage control policy comprises instructions indicating one or more conditions under which the document is to be erased or is to be rendered inaccessible.

7. A mobile computing device, comprising:
   a processor; and
   a memory in communication with the processor, the memory comprising instructions stored thereupon which, when executed by the processor, cause the processor to:
      store personal data associated with a user of the mobile computing device;
      store enterprise data associated with an enterprise;
      store one or more policies, each policy comprising instructions for at least one of controlling access to the enterprise data and handling of the enterprise data, wherein at least one policy of the one or more policies comprises instructions specifying a plurality of hierarchical lock levels that each permit access to a portion of the enterprise data that has been defined as accessible at that lock level, the plurality of lock levels including a first lock level that is assigned to a first portion of the enterprise data and a second lock level lower than the first lock level that is assigned to a second portion of the enterprise data and instructions specifying that users are required to provide a first authentication at the first lock level assigned to the first portion of the enterprise data to access the first portion of the enterprise data and are required to provide a second authentication at the second lock level assigned to the second portion of the enterprise data to access the second portion of the enterprise data;
      receive a request to lock the first portion of the enterprise data from the user;
      in response to receiving the request to lock the first portion of the enterprise data, prompt the user for the first authentication at the first lock level assigned to the first portion of the enterprise data specified in the request and receive the first authentication at the first lock level from the user;
      in response to receiving the request to lock the first portion of the enterprise data and receiving the first authentication at the first lock level assigned to the first portion of the enterprise data specified in the request, automatically lock the first portion of the enterprise data and the second portion of the enterprise data without requiring the second authentication at the second lock level for the second portion of the enterprise data;
      receive a request to access the second portion of the enterprise data; and
      allow or deny access to the second portion of the enterprise data in accordance with the one or more policies.

8. The mobile computing device of claim 7, wherein the one or more policies further comprises a storage control policy comprising instructions that dictate storage of the enterprise data in the memory.

9. A computer-implemented method comprising:
   receiving, at a client computing device, a policy comprising a lock policy specifying a plurality of hierarchical lock levels that each permit access to a document that has been defined as accessible at that lock level, the plurality of lock levels including a first lock level assigned to a first document and a second lock level lower than the first lock level that is assigned to a second document, wherein the policy further specifies that users are required to provide a first authentication at the first lock level assigned to the first document to access the first document and are required to provide a second authentication at the second lock level assigned to the second document to access the second document;
   receiving a request to lock the first document from a user;
   in response to receiving the request to lock the first document, prompt the user for the first authentication at the first lock level assigned to the first document specified in the request and receiving the first authentication at the first lock level from the user;

in response to receiving the request to lock the first document and receiving the first authentication at the first lock level assigned to the first document specified in the request, automatically lock the first document and the second document without requiring the second authentication at the second lock level for the second document;

receiving, at the client computing device, a request to access the second document; and allowing or denying access to the second document in accordance with the policy.

10. The computer-implemented method of claim 9, wherein the lock policy further comprises instructions specifying one or more lock levels that each permit access to the document based on a location of a client computing device requesting access to the document.

11. The computer-implemented method of claim 9, wherein the policy further comprises a storage control policy comprising instructions that dictate storage of the document on the client computing device.

12. The computer-implemented method of claim 11, wherein the storage control policy comprises instructions indicating whether the document is able to be cached on the client computing device and, if the document can be cached, for how long the document can be cached.

13. The computer-implemented method of claim 11, wherein the storage control policy further comprises instructions indicating how long the document can be stored on the client computing device.

14. The computer-implemented method of claim 11, wherein the storage control policy comprises instructions indicating one or more conditions under which the document is to be erased or is to be rendered inaccessible.

15. The computer-implemented method of claim 9, wherein the lock policy further comprises instructions specifying one or more lock levels that each permit access to the document in response the client computing device being connected with a network at a workplace.

16. The computer-implemented method of claim 9, wherein the policy specifies that the document is not accessible on a mobile computing device.

17. The computer-implemented method of claim 9, wherein the policy specifies that the document is not accessible via a network.

18. The computer-implemented method of claim 17, wherein the network is a cellular network.

19. The computer-implemented method of claim 17, wherein the network is a WIFI access network.

20. The computer-implemented method of claim 9, wherein the policy specifies that the document is accessible based upon a usage of a function or application on a mobile computing device.

* * * * *